No. 643,815. Patented Feb. 20, 1900.
F. DUDERSTADT.
ACETYLENE GAS PRODUCER.
(Application filed Feb. 20, 1899.)
(No Model.)
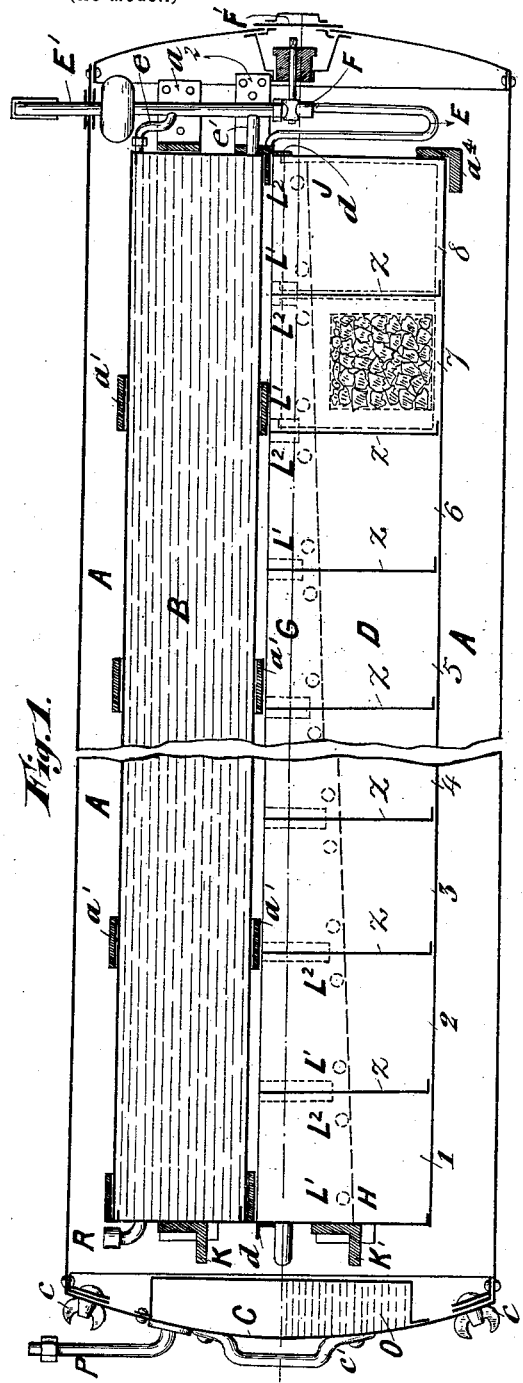
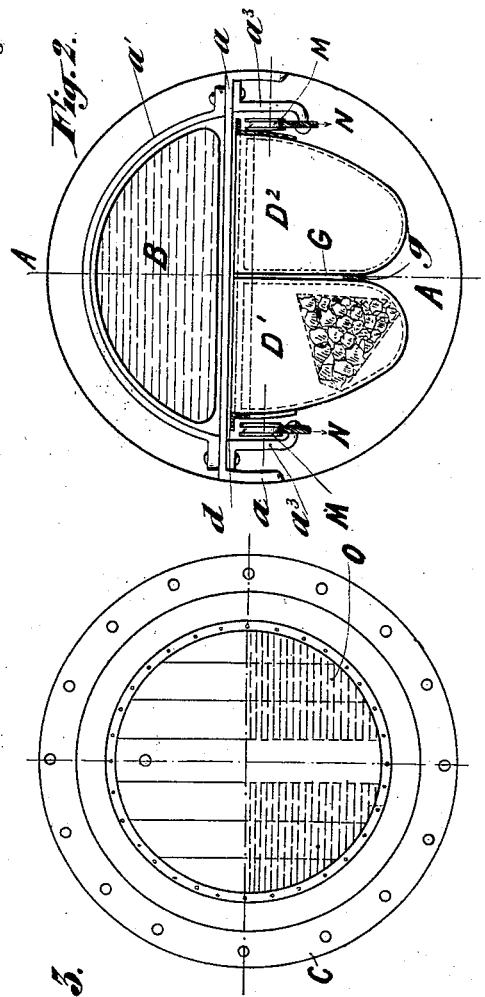
Witnesses
George M Richards
C. D. Davis
Inventor
Ferdinand Duderstadt
by W. H. Babcock
Atty

UNITED STATES PATENT OFFICE.

FERDINAND DUDERSTADT, OF LEIPSIC, GERMANY.

ACETYLENE-GAS PRODUCER.

SPECIFICATION forming part of Letters Patent No. 643,815, dated February 20, 1900.

Application filed February 20, 1899. Serial No. 706,298. (No model.)

*To all whom it may concern:*

Be it known that I, FERDINAND DUDERSTADT, a subject of the King of Bavaria, residing at Leipsic, Kingdom of Saxony, German Empire, have invented certain new and useful Improvements in Acetylene-Gas-Producing Apparatus for Railway-Cars and the Like, of which the following is a specification.

This invention relates to acetylene-gas-producing apparatus, and has more particularly for its object to provide an improved apparatus of this character for maintaining the lights thereon.

With this object in view my invention consists of a cylindrical casing containing an inner water-reservoir and a carbid-holder, suitably divided into successively-operating sections by the flow of the water of said reservoir and in accordance with the needs of consumption, said cylindrical or outer casing serving at the same time as a gas-holder to hold the gas before it flows to the burners on the car, and the apparatus being so constructed and arranged as to occupy small space and to allow the various parts thereof to be easily and readily taken apart for charging water and carbid and cleansing, repairing, or any other purposes.

In order that this my invention may be the more readily understood and carried into practical effect, reference is hereby made to the accompanying sheet of illustrative drawings, in which—

Figure 1 is a vertical longitudinal sectional view of the apparatus constructed in accordance with my invention. Fig. 2 is a cross-sectional view of the improved apparatus. Fig. 3 is an inner view of the removable cover, to which a gas-purifying apparatus is secured.

In the drawings like letters and numerals refer to like parts throughout all the figures.

Referring to the drawings, A indicates a cylindrical metal casing, which may be secured to the under side of the car-bottom in any suitable way. One end of said casing is closed, while the other end thereof is open and adapted to be closed in operation by means of a removable cover C, as hereinafter described. Within casing A are secured flat brace-bars $a$, arranged at suitable intervals and serving to support the water-reservoir B, preferably made of semicircular form in cross-section, as in Fig. 2. Said water-reservoir B is held against lateral movement by arched bars $a'$, suitably secured to said brace-bars $a$, and against longitudinal movement by angle-bars $a^2$, secured to the walls of casing A, at the innermost end thereof, and by sliding bolt K, which may be of any preferred construction and locked in any suitable way. The water-reservoir will be filled through inlet R, provided at the fore end thereof and adapted to be shut off in operation.

To the inner brace-bars $a$, near the walls of casing A, are secured suitable brackets $a^3$, supporting rails N, attached thereto, and over which run rollers M, journaled in the walls of the carbid-holder D. (See Fig. 2.) The inner end of this carbid-holder abuts when in place against an angle-iron $a^4$, secured to the walls of casing A, or may be limited in its movement by any suitable part, and said carbid-holder is then locked at its fore end by means of an easily-removable sliding bolt K', which may be similar to sliding bolt K for locking water-reservoir B. Said carbid-holder D is divided into two halves D' and D², slightly held out of contact by a slightly-inclined flat metal bar $g$, Fig. 2, and rigidly secured together by angle-bars $d$, running around said holder-halves D' and D² at their upper edges, as shown in Figs. 1 and 2. The latter are divided into a plurality of sections 1 2 3 4 5 6 7 8 by partitions $z$ to receive perforated boxes or wire baskets containing the carbid, said sections being open at their upper ends and connected to the space G between the halves D' and D² by water-inlet holes L' and L², alternately arranged on each side of said space and at some distance from inclined bottom $g$ thereof. The said carbid-holder D is of sheet metal, and the interval between the inner walls of its two parts and above the bar $g$ provides a long narrow water-space, regularly increasing in depth from the rear to the front end.

The water-reservoir B is provided at its innermost end with a bent pipe E, having a stop-cock F, and through which the water may flow into said space G from the discharge end of the said pipe, the latter having branches $e\ e'$, which extend into the water-tank B, near the top and bottom of the latter, respectively, and having its upper part E' extended above the casing A and open to the outer air. The upper branch $e$ serves as an air-vent. The lower branch $e'$ allows the water to run down into the carbid-holder. The stop-cock F may be operated through a suitable door F', provided in the bottom plate of casing A. The flat bar $g$, forming the bottom of space or water-conduit G, is inclined from J toward H and the water-inlet holes $L'$ $L^2$ arranged so that the water from reservoir B flows along said bottom $g$ until it reaches the lowermost point H thereof, when it enters section 1 of carbid-holder $D'$ to convert the carbid contained therein to acetylene gas. Then the water enters section 1 of carbid-holder $D^2$, and so on, successively, all the sections of the carbid-holders.

As aforestated, casing A is open at its fore end and adapted to be tightly closed by means of a suitable cover C, preferably secured thereto by winged screws $c$ and provided with a handle $c'$ or the like. Said cover carries a gas-purifying box O, suitably secured thereto, and which may be of any well-known construction. The acetylene-gas produced in the carbid-holders and contained in casing A is forced to pass through said box before reaching pipe P, leading therefrom and removably connected with the pipe (not shown) leading the gas to the burners. As I make no claim to any especial construction of this purifying-box O, it has seemed unnecessary to illustrate it except by conventional indication. Of course its inner face must be adapted to hold the spongy or other contents, while allowing gas to flow through it. This may be conveniently effected by the use of a perforated plate or woven screen as the inner wall of the said box.

It will be seen from the aforegoing construction that after removing cover C and unlocking sliding bolt K' the carbid-holder D may be easily withdrawn from casing A for removing the residues and charging fresh carbid.

The improved apparatus operates as follows: After shutting off stop-cock F the water-reservoir B is filled with water through inlet R and the latter then shut off. Now the carbid-holder $D'$ $D^2$, charged with carbid, will be introduced into casing A and locked by means of sliding bolt K' and the cover C, with the purifying apparatus tightly secured to casing A. Thus the apparatus is ready for use. Upon the opening of stopcock F the water will slowly flow into space G and along the inclined bottom $g$ thereof to the lowermost inlet-hole $L'$, through which it enters section 1 of carbid-holder $D'$ to produce acetylene gas. The pressure of the gas raising by reason of an insufficient consumption thereof, the bent pipe E will cease to discharge water into space G, and by further increase of said pressure the water in said siphon will be forced back until it reaches the curved bottom thereof. The apparatus is so constructed and arranged that the pressure within casing A will then be equal to the pressure of a column of water of thirty centimeters, provided that water-reservoir B be still filled with water. A still further increase of the gas-pressure within casing A forces the gas to flow through bent pipe E into the outer air, which scarcely occurs, the different carbid-sections acting one after the other to produce acetylene gas and the water being only admitted in accordance with the consumption of the gas.

The vibrations of the vehicle do not influence the perfect and accurate operation of the apparatus by reason of the small size of the water-conduits. As the lights of the vehicle are continually maintained, the different carbid-sections will be successively thrown in action to produce acetylene gas, and finally the pressure of said gas becomes lower than that required for the maintaining of the lights, whereby the lighting will be lessened, which indicates that the apparatus is to be recharged. The duration of lighting of one charge may previously be determined by the amount of carbid of said charge, or the complete consumption of said carbid may be automatically notified by any suitable alarm or signal device.

As it is obvious that many changes in the construction and relative arrangement of parts might be resorted to without departing from the spirit and scope of my invention, I would have it understood that I do not restrict myself to the particular construction and arrangement of parts shown and described, but that such changes and equivalents may be substituted therefor.

Having fully described my invention, what I claim, and desire to secure by Letters Patent, is—

1. In an acetylene-gas-producing apparatus the combination of a carbid-holder consisting of two halves held out of contact by a feed-passage and divided into a plurality of sections by means of cross-partitions, with means of water-supply communicating with the interior of each of the said sections, said carbid-holder being arranged within the gas-holder and adapted to be easily and readily withdrawn from the same, substantially as and for the purpose specified.

2. In an acetylene-gas-producing apparatus for railway-cars or the like, the combination of an inclined feed-water passage with carbid-holders arranged in successive series of sections on both sides of the said passage, and a water-supply pipe for the said passage, the said sections being provided with holes opening into said passage at successively-higher levels in order that the water may be supplied successively to the several sections to produce acetylene gas in proportion to the consumption thereof and the consequent pressure on the water.

In testimony whereof I have hereunto set my hand in the presence of two subscribing witnesses.

FERDINAND DUDERSTADT.

Witnesses:
RUDOLPH FRICKE,
EVLYN LANG.